United States Patent
Reznak (12)

(10) Patent No.: US 6,601,083 B1
(45) Date of Patent: Jul. 29, 2003

(54) MULTITASKING DATA PROCESSING SYSTEM AND METHOD OF CONTROLLING ALLOCATION OF A SHARED RESOURCE

(76) Inventor: Frederick John Reznak, 303 Dundalk Way, Cary, NC (US) 27511-5057

( * ) Notice: Subject to any disclaimer, the term of this patent is extended or adjusted under 35 U.S.C. 154(b) by 0 days.

(21) Appl. No.: 08/705,449

(22) Filed: Aug. 29, 1996

(51) Int. Cl.[7] .................................................. G06F 9/00
(52) U.S. Cl. ........................ 709/104; 709/102; 710/240
(58) Field of Search .............................. 395/670, 674; 709/100, 101, 102, 103, 104, 107, 108; 710/240, 241

(56) References Cited

U.S. PATENT DOCUMENTS

| 4,330,825 A | | 5/1982 | Girard |
| 5,179,662 A | | 1/1993 | Corrigan et al. |
| 5,210,872 A | * | 5/1993 | Ferguson et al. |
| 5,421,011 A | * | 5/1995 | Camillone et al. |
| 5,491,807 A | | 2/1996 | Freeman et al. |
| 5,640,569 A | * | 6/1997 | Miller et al. |
| 5,713,013 A | * | 1/1998 | Black |

FOREIGN PATENT DOCUMENTS

JP   02-304655   12/1990

OTHER PUBLICATIONS

IBM Technical Disclosure Bulletin, "Storage Compression Algorithm", vol. 29, No. 6, Nov., 1986.

* cited by examiner

Primary Examiner—Majid A. Banankhah

(57) ABSTRACT

A multitasking data processing system having a plurality of tasks and a shared resource and a method of controlling allocation of shared resources within a multitasking data processing system are disclosed. In response to a resource request for a portion of a shared resource by a particular task among the plurality of tasks, a determination is made whether or not granting the resource request would cause a selected level of resource allocation to be exceeded. In response to a determination that granting the resource request would not cause the selected level of resource allocation to be exceeded, the resource request is granted. However, in response to a determination that granting the resource request would cause the selected level of resource allocation to be exceeded, execution of the particular task is suspended for a selected penalty time. In one embodiment of the present invention, the shared resource is a memory.

17 Claims, 5 Drawing Sheets

MULTITASKING DATA PROCESSING SYSTEM AND METHOD OF CONTROLLING ALLOCATION OF A SHARED RESOURCE

BACKGROUND OF THE INVENTION

1. Technical Field

The present invention relates in general to a method and system for data processing and in particular to method and system for controlling the allocation of a shared resource in a multitasking data processing system. Still more particularly, the present invention relates to a multitasking data processing system and method of controlling the allocation of shared resources, which penalize tasks that request more than an allocated amount of a shared resource.

2. Description of the Related Art

Multitasking data processing systems, that is, data processing systems operating under the control of a multitasking operating system, subdivide the work to be accomplished by each application into multiple tasks (or threads). The multiple tasks are each allotted a small quantum of processing time, for example, according to task priority or in round robin fashion, thereby creating the appearance that the multiple tasks are executing concurrently. Conventionally, the tasks comprising an application are corporately allocated a limited set of shared resources, which are accessible to each task and include, for example, dynamic memory. Although judicious apportionment of the shared resources among the multiple tasks is required for efficient operation of the application, executing tasks are often permitted to request and obtain any available portion of the shared resources up to and including all remaining resources. Additional requests for shared resources made after the shared resources are fully allocated simply fail or are answered with error messages, thereby depriving other tasks of critical resources. Thus, the overuse of shared resources by one task can potentially deprive all other tasks of needed resources, resulting in the failure of the other tasks or incomplete and unrecoverable work. This problem is compounded by the fact that current processing speeds permit a task to consume the available shared resources too quickly for a human operator to intervene and reallocate the shared resources.

As should thus be apparent, an improved method for automatically controlling the allocation of shared resources in a multitasking data processing system is needed that prevents tasks from overusing shared resources.

SUMMARY OF THE INVENTION

It is therefore one object of the present invention to provide a method and system for data processing.

It is another object of the present invention to provide a method and system for controlling the allocation of a shared resource in a multitasking data processing system.

It is yet another object of the present invention to provide a multitasking data processing system and method of controlling the allocation of shared resources, which penalize tasks that request more than an allocated amount of a shared resource.

The foregoing objects are achieved as is now described. A multitasking data processing system having a plurality of tasks and a shared resource and a method of controlling allocation of shared resources within a multitasking data processing system are provided. In response to a resource request for a portion of a shared resource by a particular task among the plurality of tasks, a determination is made whether or not granting the resource request would cause a selected level of resource allocation to be exceeded. In response to a determination that granting the resource request would not cause the selected level of resource allocation to be exceeded, the resource request is granted. However, in response to a determination that granting the resource request would cause the selected level of resource allocation to be exceeded, execution of the particular task is suspended for a selected penalty time. In one embodiment of the present invention, the shared resource is a memory.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
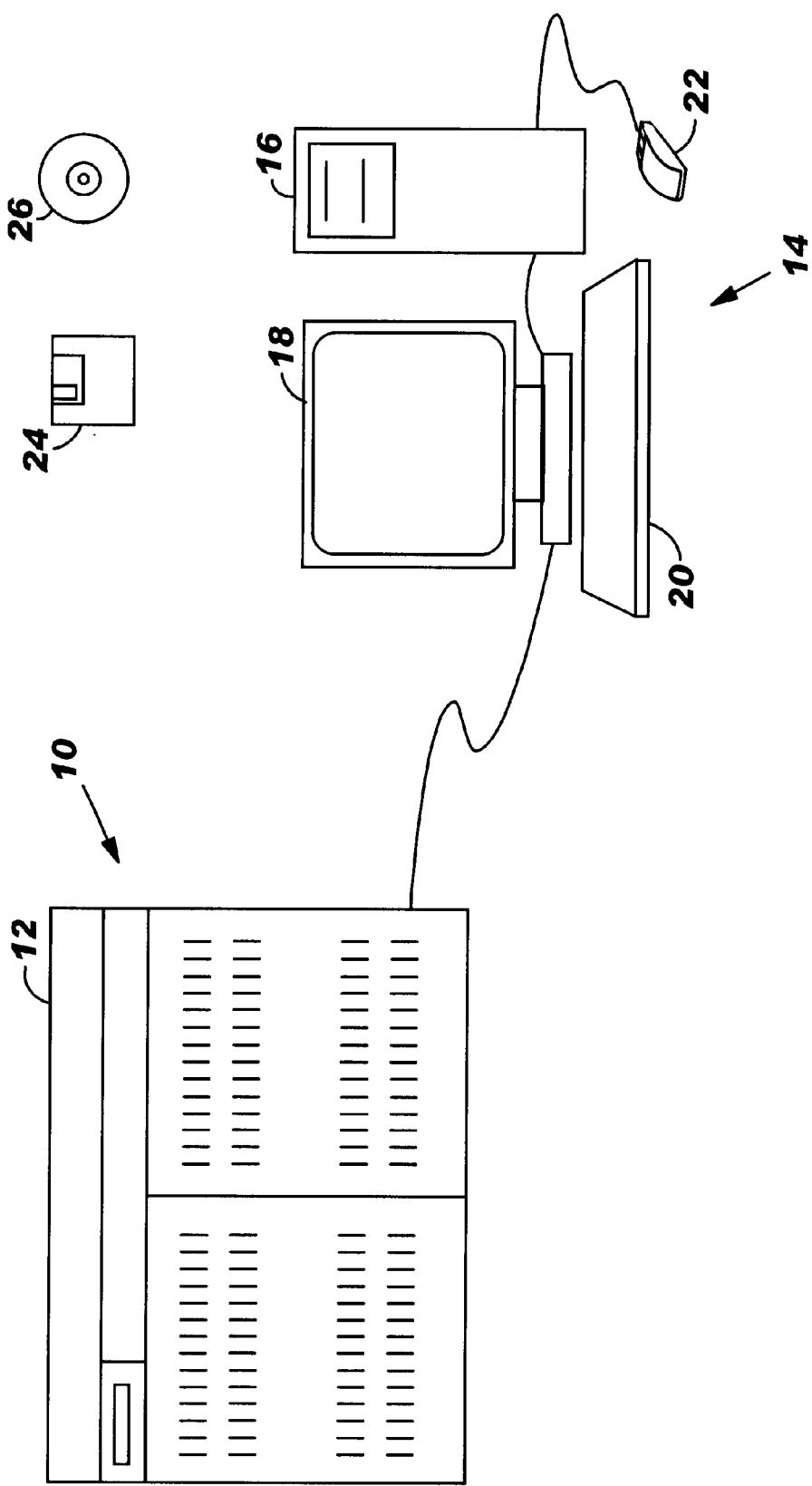
FIG. 1 depicts an illustrative embodiment of a data processing system with which the present invention can advantageously be utilized.

With reference now to the figures and in particular with reference to FIG. 1, there is depicted an illustrative embodiment of a multitasking data processing system in accordance with the present invention. As illustrated, data processing system 10 comprises system unit 12 and one or more local nodes 14, which include personal computer 16, display device 18, keyboard 20, and mouse 22. As is well-known to those skilled in the art, personal computer 16 can receive input data via keyboard 20, mouse 22, or other suitable user input device. In addition, personal computer 16 can retrieve data and application programs for processing that reside within recordable media such as diskette 24 and CD-ROM 26. The user can execute an application locally utilizing personal computer 16, or invoke execution of the application on system unit 12 or a remote node 14 utilizing well-known network communication techniques. System unit 12 and personal computer 16 output data to a user via display device 18.

Figure 2:
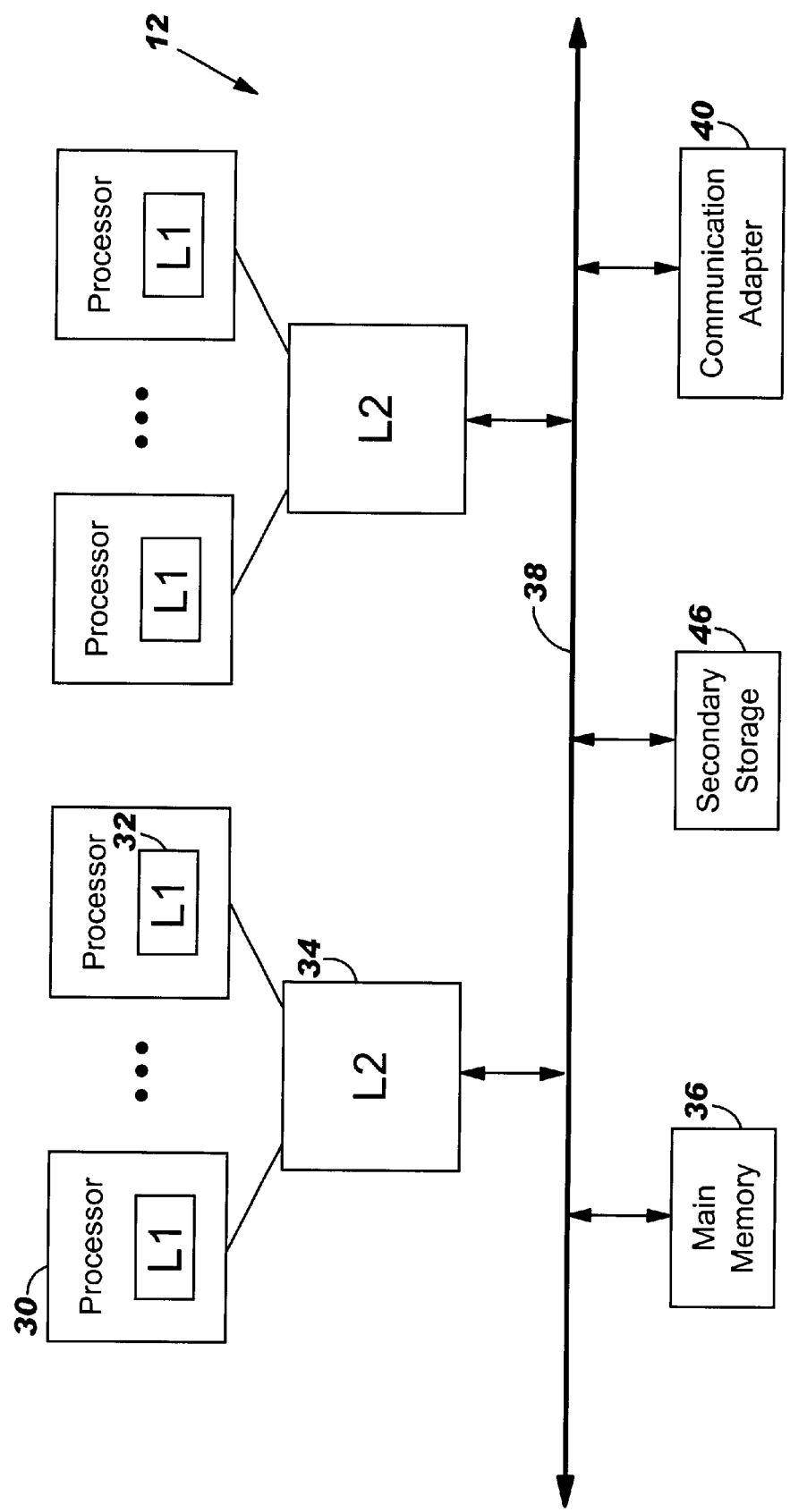
FIG. 2 illustrates a more detailed block diagram representation of the processing unit depicted in FIG. 1.

Referring now to FIG. 2, a high level block diagram of system unit 12 is illustrated. System unit 12 preferably comprises a mainframe computer such as the IBM System/390, but could alternatively comprise a workstation such as the IBM RISC System/6000. System unit 12 includes one or more processors 30, which are each capable of executing a task (i.e., thread) within one of a number of concurrently executing multi-task applications. Each processor 30 has an on-board level one (L1) cache 32 and an associated level two (L2) cache 34 that provide high speed storage for instructions and data. Additional storage for instructions and data is provided by main memory 36 and secondary storage 46, which communicate with each L2 cache 34 via system bus 38. As is typical of multitasking data processing systems, each application executing within system unit 12 is allocated its own virtual memory space, which is mapped partially into main memory 36 and partially into secondary storage 46 by a memory manager. System unit 12 also includes communication adapter 40 through which multiple nodes 14 can access system resources available within system unit 12. As will be appreciated by those skilled in the art, system unit 12 includes additional hardware coupled to system bus 38 that is not necessary for an understanding of the present invention and is accordingly omitted for simplicity.

Figure 3:
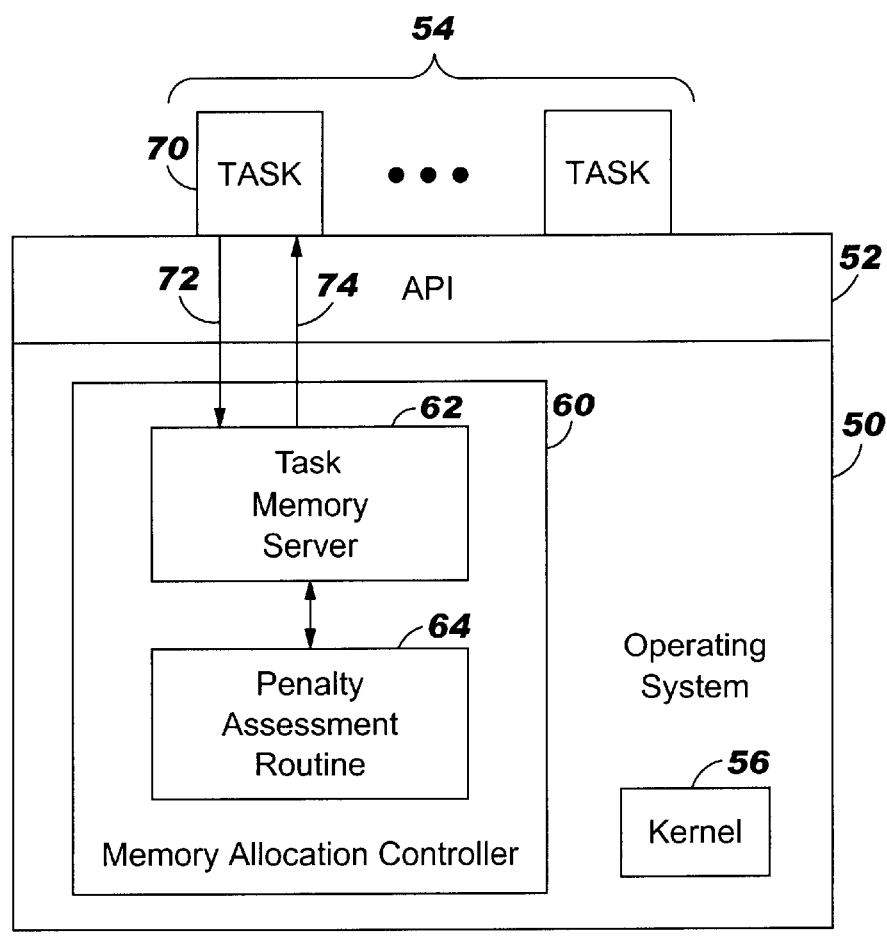
FIG. 3 is a layer diagram depicting the software configuration of the data processing system illustrated in FIG. 1, which includes a number of tasks and a memory allocation controller in accordance with the present invention.

With reference now to FIG. 3, there is depicted a layer diagram of the software configuration of system unit 12, which, as illustrated, includes an operating system 50, an Application Programming Interface (API) 52, and a plurality of tasks 54. In accordance with the present invention, tasks 54, although independent from each other and running in parallel, share a single virtual memory space in common. In contrast to tasks executing within prior art multitasking data processing systems, tasks 54 cannot arbitrarily utilize any unallocated portion of the shared virtual memory space, but as described below are managed by operating system 50 to prevent overutilization of the shared virtual memory space by one or all of tasks 54.

Operating system 50, which comprises a multitasking operating system such as MVS (Multiple Virtual Storage), includes kernel 56, which is the layer of operating system 50 that interacts most directly with system hardware. Kernel 56 implements system services, controls network access, implements one or more file systems within secondary storage 46, and schedules and dispatches tasks 54 for execution on processors 30. In addition, operating system 50 further includes memory allocation controller 60, which controls the allocation of virtual memory space to tasks 54 and is in turn comprised of task memory server 62 and penalty assessment routine 64, which are illustrated in flowchart form in FIGS. 5 and 6, respectively. As described below in greater detail, task memory server 62 allocates virtual memory to a requesting task 70 among tasks 54 in response to receipt of a memory allocation request 72 transmitted via (API) 52. Conversely, task memory server 62 frees virtual memory allocated to a particular task by transmitting a memory release request 74. In an alternative embodiment of the present invention, memory allocation controller 60 comprises a portion of an application program that includes tasks 54.

Figure 4:
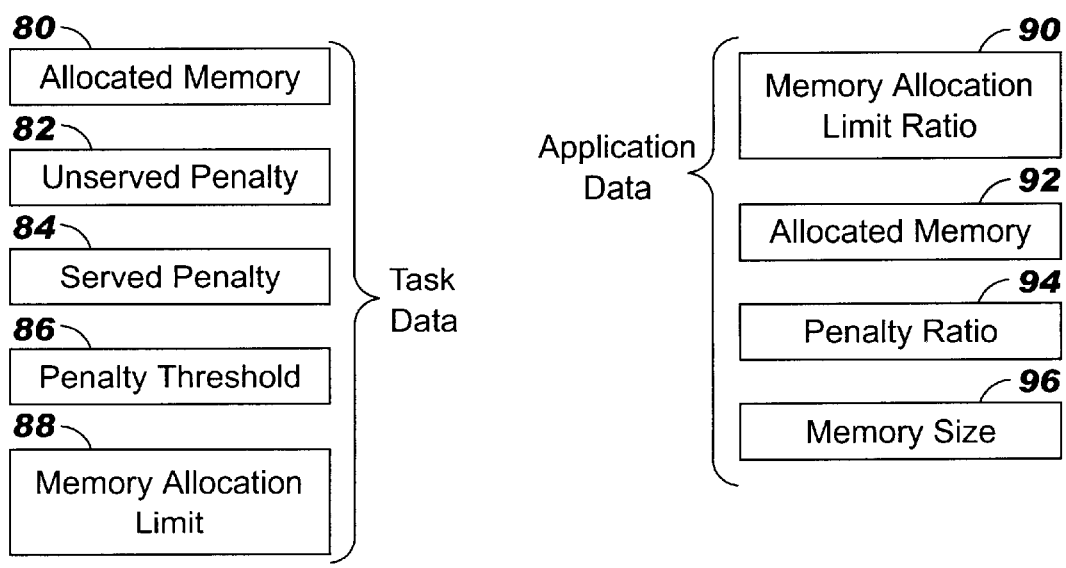
FIG. 4 is an illustration of the data utilized by the memory allocation controller depicted in FIG. 3.

Referring now to FIG. 4, the data utilized by memory allocation controller 60 in controlling the allocation of virtual memory to tasks 54 are illustrated. As depicted, each of tasks 54 has an associated set of data including an allocated memory counter 80 for tracking the number of bytes of virtual memory allocated to the associated task 54, an unserved penalty counter 82 that stores the amount of unserved penalty time assessed to the associated task 54, and a served penalty counter 84 that stores the cumulative amount of penalty time served by the associated task 54. In addition, each task 54 has a penalty threshold register 86, which specifies a threshold number of virtual memory bytes that the associated task 54 can request without incurring a penalty, and a memory allocation limit register 88, which indicates the maximum number of virtual memory bytes that can be allocated to the associated task 54. Counters 80–84 are created in the data areas assigned to each task 54 by the application program that attaches tasks 54 and are manipulated and updated only by task memory server 62. Registers 86 and 88, on the other hand, are both user and software-accessible in order to permit the penalty threshold and the memory allocation limit to be set prior to and during execution of tasks 54. If the penalty threshold and memory allocation limit are not otherwise set, memory allocation controller 60 will set the penalty threshold and the memory allocation limit to default values. It is important to note that the memory allocation limit and the penalty threshold can be set independently of each other and of the total amount of virtual memory space shared by tasks 54.

Still referring to FIG. 4, the data storage utilized by memory allocation controller 60 further includes a memory size register 96, which indicates the total amount of virtual memory within the memory space allotted to all of tasks 54, and an application allocated memory counter 92, which indicates the amount of virtual memory currently allocated to all of tasks 54. In addition, a memory allocation limit ratio register 90 is provided that specifies a maximum amount of virtual memory that can be allocated to a particular task 54 as a percentage of a theoretical maximum size of the particular task 54. The theoretical maximum size can be calculated as the sum of the memory allocated to the particular task 54 (i.e., the contents of the task allocated memory register 80 associated with the particular task 54) and the amount of free memory in the application's virtual memory space, where the free memory can be determined by subtracting the contents of application allocated memory counter 92 from the value of memory size register 96. Finally, the data storage utilized by memory allocation controller 60 includes a penalty ratio register 94 that indicates the amount of virtual memory bytes that can be allocated to a requesting task 70 as a percentage of its theoretical maximum size without the requesting task 70 incurring a penalty. The data stored in memory allocation limit ratio register 90, application allocated memory counter 92, penalty ratio register 94, and memory size register 96 are said to be "application data" because only tasks comprising a single application program are typically assigned a shared virtual memory space.

Figure 5:
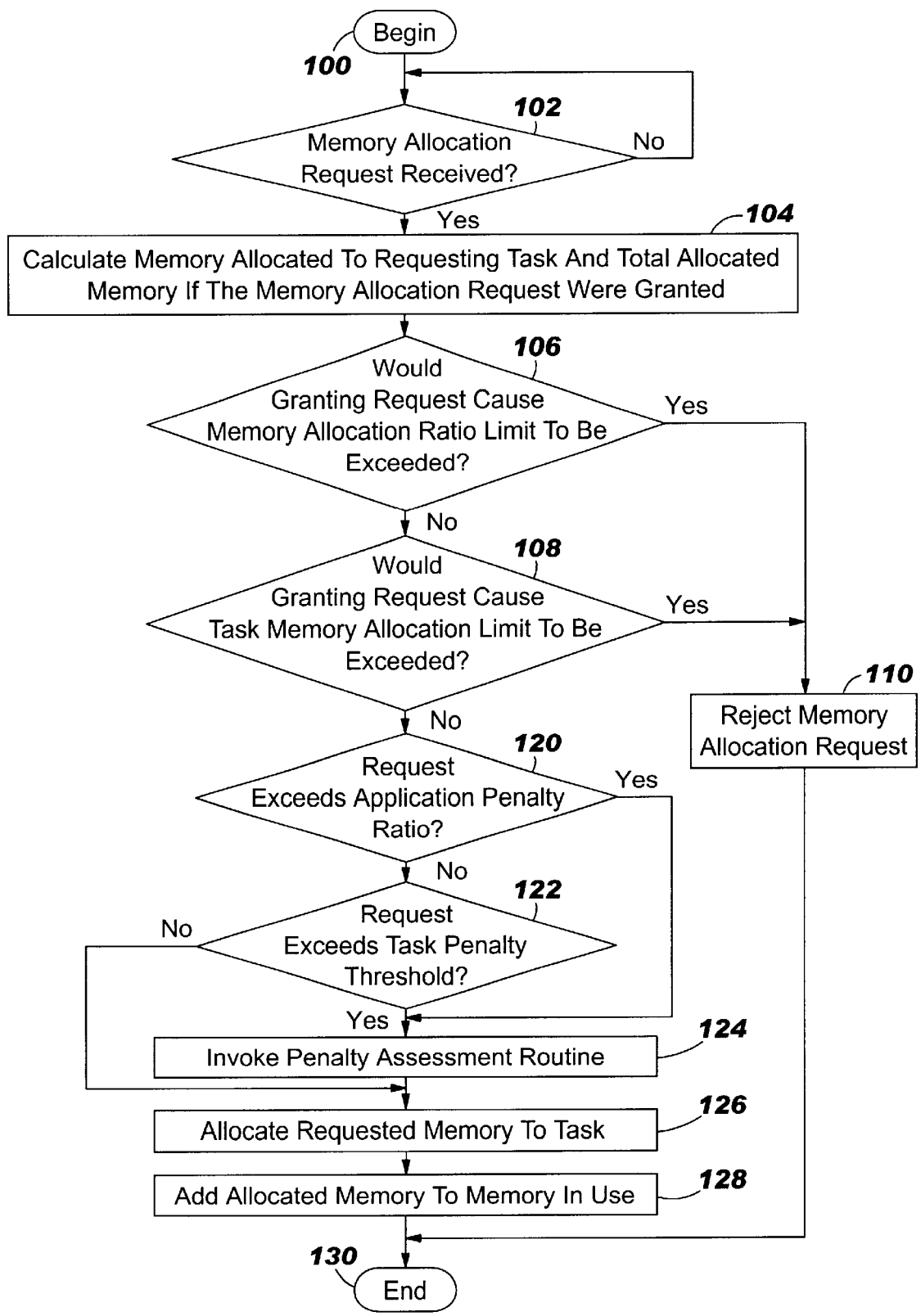
FIG. 5 is a flowchart depicting the operation of the task memory server of the memory allocation controller.

With reference now to FIG. 5, there is depicted a high level logical flowchart of the operation of task memory server 72. As depicted, the process begins at block 100 and thereafter proceeds to block 102, which depicts a determination by task memory server 62 of whether or not a memory allocation request 72 has been received from a requesting task 70. If not, the process iterates at block 102 until such time as a memory allocation request 72 is received. In response to receipt of memory allocation request 72 by task memory server 62, the process proceeds from block 102 to block 104, which illustrates task memory server 62 calculating both the number of bytes of virtual memory that would be allocated to requesting task 70 and the total amount of memory that would be allocated to tasks 54 if memory allocation request 72 were granted. The steps illustrated at block 104 maybe accomplished, for example, by separately adding the contents of each of allocated memory registers 80 and 92 with the number of virtual memory bytes specified within memory allocation request 72. The process then proceeds from block 104 to block 106, which depicts a determination of whether or not granting memory allocation request 72 would cause the application memory allocation ratio limit specified within register 90 to be exceeded. If so, task memory server 62 rejects memory allocation request 72, as depicted at block 110. If, however, a determination is made at block 106 that granting memory allocation request 72 would not cause the application memory allocation limit ratio to be exceeded, the process proceeds to block 108, which depicts a similar determination of whether or not granting memory allocation request 72 would cause the task memory allocation limit associated with requesting task 70 to be exceeded. If so, task memory server 62 rejects memory allocation request 72 at block 110. Thereafter, the process terminates at block 130 with an error condition being reported to requesting task 70.

Returning to block 108, in response to a determination that granting memory allocation request 72 would not cause the task memory allocation limit of requesting task 70 to be exceeded, the process proceeds to block 120, which illustrates a determination of whether or not granting memory allocation request 72 would cause the application penalty ratio specified within penalty ratio register 94 would be exceeded. If so, the process proceeds to block 124, which is described below. However, in response to a determination at block 120 that granting memory allocation request 72 would not cause the application penalty ratio to be exceeded, the process proceeds to block 122, which depicts a determination of whether or not granting memory allocation request 72 would cause the task penalty threshold specified within penalty threshold register 86 to be exceeded. If not, the process proceeds to block 126. However, in response to a determination at block 122 that granting memory allocation request 72 would cause the task penalty threshold to be exceeded, the process proceeds to block 124.

Block 124 depicts task memory server 62 invoking penalty assessment routine 64 in order to penalize requesting task 70 for exceeding either the task penalty threshold specified within register 86 or the application penalty ratio specified within register 94. Next, the process passes to block 126, which depicts task memory server 62 allocating the memory requested within memory allocation request 72 to requesting task 70 following the execution of penalty assessment routine 64. Thus, memory allocation requests that exceed the task penalty threshold or penalty ratio are not denied, but are serviced after a penalty has been assessed to and served by requesting task 70. The process proceeds from block 126 to block 128, which illustrates adding the memory allocated at block 126 to both allocated memory counters 80 and 92. Thereafter, the process terminates at block 130.

Figure 6:
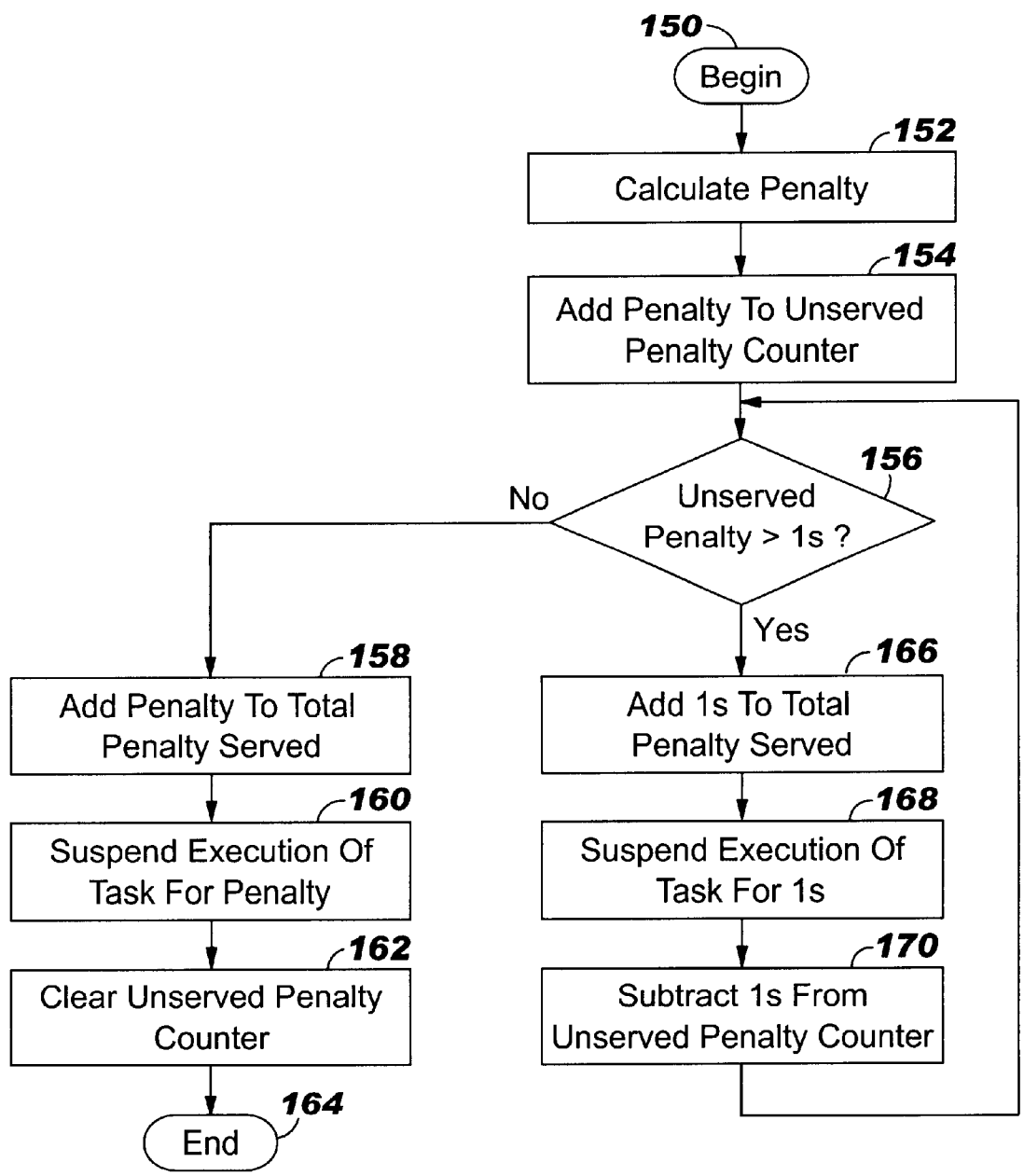
FIG. 6 is a flowchart illustrating the operation the penalty assessment routine of the memory allocation controller.

Referring now to FIG. 6, there is illustrated a high level logical flowchart of penalty assessment routine 64. The process begins at block 150 in response to invocation by task memory server 62, as illustrated at block 124 of FIG. 5, and thereafter proceeds to block 152. Block 152 illustrates penalty assessment routine 64 calculating the duration of the penalty period for which execution of requesting task 70 is to be suspended. In a preferred embodiment of the present invention, the penalties incurred for exceeding the penalty ratio and the task penalty threshold are different. The penalty incurred for exceeding the task penalty threshold ($P_{TPT}$) can be expressed as a function of the bytes requested (br) by requesting task 70, the bytes allocated (ba) to requesting task 70, and the task penalty threshold (pt) as follows:

$$P_{TPT} = 1\ \mu s * br * 2^{10\left(\frac{br+ba}{pt}-1\right)}$$

As can be seen from the above equation, the delay penalty incurred by requesting task 70 for exceeding the task penalty threshold is equal to one microsecond per byte requested multiplied by two raised to the power of the number of 10% increments by which the allocated memory (after the request is granted) exceeds the task penalty threshold. The penalty incurred for exceeding the application penalty ratio ($P_{APR}$) can similarly be expressed as a function of the bytes requested (br) by requesting task 70, the bytes allocated (ba) to requesting task 70, the memory size (ms) allotted to the application, the memory allocated (ma) to all of tasks 54, and the application penalty ratio (apr) as follows:

$$P_{APR} = 1\ \mu s * br * 2^{2\left(\frac{1}{1+\frac{ms-ma}{br+ba}}-apr\right)}$$

Thus, the delay penalty incurred by requesting task 70 is equal to one microsecond per byte requested multiplied by two raised to the power of the number of 0.5% increments that the penalty ratio is exceeded by the percentage that the memory allocated to requesting task 70 (after the request is granted) is of the theoretical maximum size of requesting task 70. From inspection of the above equations, it is evident that requesting task 70 incurs an exponentially greater penalty for each additional byte requested over the penalty thresholds. The penalty incurred for exceeding the application penalty ratio is greater than that incurred for exceeding the task penalty threshold since the depletion of the remaining free virtual memory space by requesting task 70 has an adverse effect on the execution of all of tasks 54, and not just requesting task 70.

The process proceeds from block 152 to block 154, which depicts adding the penalty calculated at block 152 to the unserved penalty counter 82 associated with requesting task 70. A determination is then made at block 156 whether or not the unserved penalty specified within unserved penalty counter 82 is greater than one second. If not, the process proceeds to blocks 158–162, which illustrate adding the contents of unserved penalty counter 82 to the contents of served penalty counter 84, suspending execution of requesting task 70 for the specified unserved penalty time, and then clearing unserved penalty counter 82. Thereafter, the process terminates at block 164.

Returning to block 156, in response to a determination that the value of unserved penalty counter 82 is greater than one second, the process passes to block 166, which depicts adding one second to served penalty counter 84. Next, as depicted at block 168, execution of requesting task 70 is suspended for one second. The process then proceeds from block 168 to block 170, which illustrates subtracting one second from unserved penalty counter 82. The process thereafter returns to block 156, which has been described. Serving long penalties in the manner illustrated at blocks 166–170 permits unserved penalty counter 82 and served penalty 84 to be updated in a manner which enables the value of counters 82 and 84 to be viewed by operators for evaluation and problem diagnosis.

As has been described, the present invention provides an improved method and system for controlling the allocation of shared resources within a multitasking data processing system. Although the present invention has been described with reference to a preferred embodiment in which virtual memory space is shared between multiple tasks comprising an application program, those skilled in the art will appreciate that the principles of the present invention can readily be applied to controlling the allocation of other shared resources within a multitasking data processing system, such as nonvolatile storage, input/output, and processing resources.

It is important to note that while the present invention has been described with respect to a plurality of tasks executing within a multitasking data processing system having facilities for controlling the allocation of shared resources, those skilled in the art will appreciate that the mechanisms of the present invention are capable of being distributed as a program product residing in a variety of signal-bearing media, including both recordable media such as magnetic and optical disks and transmission media such as digital and analog communications links.

While the invention has been particularly shown and described with reference to a preferred embodiment, it will be understood by those skilled in the art that various changes in form and detail may be made therein without departing from the spirit and scope of the invention.

What is claimed is:

1. A method of controlling allocation of shared resources within a multitasking data processing system having a plurality of tasks, said method comprising:

in response to a resource request for a portion of a shared resource by a particular task among said plurality of tasks, determining whether or not granting said resource request would cause a selected level of resource allocation to be exceeded and determining whether or not granting said resource request would cause a resource allocation limit to be exceeded;

in response to a determination that granting said resource request would cause said resource allocation limit to be exceeded, denying said resource allocation request;

in response to a determination that granting said resource request would not cause said selected level of resource allocation to be exceeded, granting said resource request; and in response to a determination that granting said resource request would cause said selected level of resource allocation but not said resource allocation limit to be exceeded, suspending execution of said particular task for a selected penalty time and then granting said request.

2. The method of controlling allocation of shared resources of claim 1, and further comprising:

setting said selected level of resource allocation for said particular task such that said particular task incurs said suspension in response to a resource request that would cause a portion of said shared resource allocated to said particular task to exceed said selected level of resource allocation.

3. The method of controlling allocation of shared resources of claim 1, and further comprising:

setting said selected level of resource allocation such that said particular task incurs said suspension in response to requesting an amount of an unallocated portion of said shared resource that exceeds said selected level of resource allocation.

4. The method of controlling allocation of shared resources of claim 1, and further comprising:

calculating said selected penalty time, wherein said selected penalty time is related to a size of said requested portion of said shared resource.

5. The method of controlling allocation of shared resources of claim 1, and further comprising:

maintaining a total penalty counter for each of said plurality of tasks.

6. A multitasking data processing system, comprising:

a processing unit for executing instructions;
   a first portion of memory coupled to said processing unit;
   a plurality of tasks stored within said first portion of memory and executable by said processing unit;
   a shared resource accessible to said plurality of tasks; and
   a shared resource allocation controller stored within said first portion of memory and executable by said processing unit, wherein in response to receipt of a resource request for a portion of said shared resource from a particular task among said plurality of tasks, said shared resource allocation controller denies said resource request if granting said resource request would cause a resource allocation limit to be exceeded, grants said resource request if granting said resource request would not cause a selected level of resource allocation to be exceeded, and if granting said resource request would cause said selected level of resource allocation but not said resource allocation limit to be exceeded, said shared resource allocation controller suspends execution of said particular task for a selected penalty time and then grants said resource request.

7. The multitasking data processing system of claim 6, said shared resource allocation controller further comprising:

means for setting said selected level of resource allocation for said particular task such that said shared resource allocation controller suspends said particular task in response to a request that would cause a portion of said shared resource allocated to said particular task to exceed said selected level of resource allocation.

8. The multitasking data processing system of claim 6, said shared resource allocation controller further comprising:

means for setting said selected level of resource allocation such that said particular task incurs said suspension in response to requesting an amount of an unallocated portion of said shared resource that exceeds said selected level of resource allocation.

9. The multitasking data processing system of claim 6, said shared resource allocation controller further comprising a penalty assessment routine that calculates said selected penalty time, wherein said selected penalty time is related to a size of said requested portion of said shared resource.

10. The multitasking data processing system of claim 6, and further comprising a plurality of penalty counters that each record a cumulative penalty time incurred by one of said plurality of tasks.

11. The multitasking data processing system of claim 6, wherein said shared resource comprises a second portion of memory.

12. A program product usable by a multitasking data processing system having a plurality of tasks and a shared resource accessible to said plurality of tasks, said program product comprising:

a shared resource allocation controller executable by said multitasking data processing system, wherein in response to receipt of a resource request for a portion of said shared resource from a particular task among said plurality of tasks, said shared resource allocation controller denies said resource request if granting said resource request would cause a resource allocation limit to be exceeded, grants said resource request if granting said resource request would not cause a selected level of resource allocation to be exceeded, and if granting said resource request would cause said selected level of resource allocation but not said resource allocation limit to be exceeded, said shared resource allocation controller suspends execution of said particular task for a selected penalty time and the grants said resource request; and a signal-bearing media bearing said shared resource allocation controller.

13. The program product of claim 12, said shared resource allocation controller further comprising:

means for setting said selected level of resource allocation for said particular task such that said shared resource allocation controller suspends said particular task in response to a request that would cause a portion of said shared resource allocated to said particular task to exceed said selected level of resource allocation.

14. The program product of claim 12, said shared resource allocation controller further comprising:

means for setting said selected level of resource allocation such that said particular task incurs said suspension in response to requesting an amount of an unallocated portion of said shared resource that exceeds said selected level of resource allocation.

15. The program product of claim 12, said shared resource allocation controller further comprising a penalty assessment routine that calculates said selected penalty time, wherein said selected penalty time is related to a size of said requested portion of said shared resource.

16. The program product of claim 12, and further comprising means for maintaining a plurality of penalty counters that each record a cumulative penalty time incurred by one of said plurality of tasks.

17. The program product of claim 12, wherein said shared resource allocation controller comprises a shared memory allocation controller.

* * * * *

UNITED STATES PATENT AND TRADEMARK OFFICE
CERTIFICATE OF CORRECTION

PATENT NO. : 6,601,083 B1
DATED : July 29, 2003
INVENTOR(S) : Reznak

It is certified that error appears in the above-identified patent and that said Letters Patent is hereby corrected as shown below:

Title page,
After "*Primary Examiner—Majid A. Banankhah*" and before "ABSTRACT" should read -- [74]*Attorney, Agent or Firm*—John J. Timar, Gerald R. Woods; Bracewell & Patterson, L.L.P. --

Signed and Sealed this

Twentieth Day of January, 2004

JON W. DUDAS
*Acting Director of the United States Patent and Trademark Office*